No. 708,599. Patented Sept. 9, 1902.
G. R. TUTTLE.
TRAP FOR AMALGAM.
(Application filed Aug. 7, 1901.)
(No Model.)

Witnesses.

Inventor.
George R. Tuttle

UNITED STATES PATENT OFFICE.

GEORGE R. TUTTLE, OF GRASS VALLEY, CALIFORNIA.

TRAP FOR AMALGAM.

SPECIFICATION forming part of Letters Patent No. 708,599, dated September 9, 1902.

Application filed August 7, 1901. Serial No. 71,157. (No model.)

*To all whom it may concern:*

Be it known that I, GEORGE R. TUTTLE, a citizen of the United States, residing at Grass Valley, county of Nevada, State of California, have invented certain new and useful Improvements in Traps for Amalgam; and I do hereby declare the following to be a full, clear, and exact description of the same.

The present invention is designed mainly for use in connection with the stamp-battery, although it is equally effective in connection with the apron of the battery or at any point over which the amalgam is carried; and the object of the invention is to provide a simple and inexpensive trap by means of which the amalgam is caught and retained, thus overcoming the loss of such amalgam as is not collected by the amalgamating-plates proper.

To comprehend the invention, reference should be had to the accompanying sheet of drawings, wherein—

Figure 1:
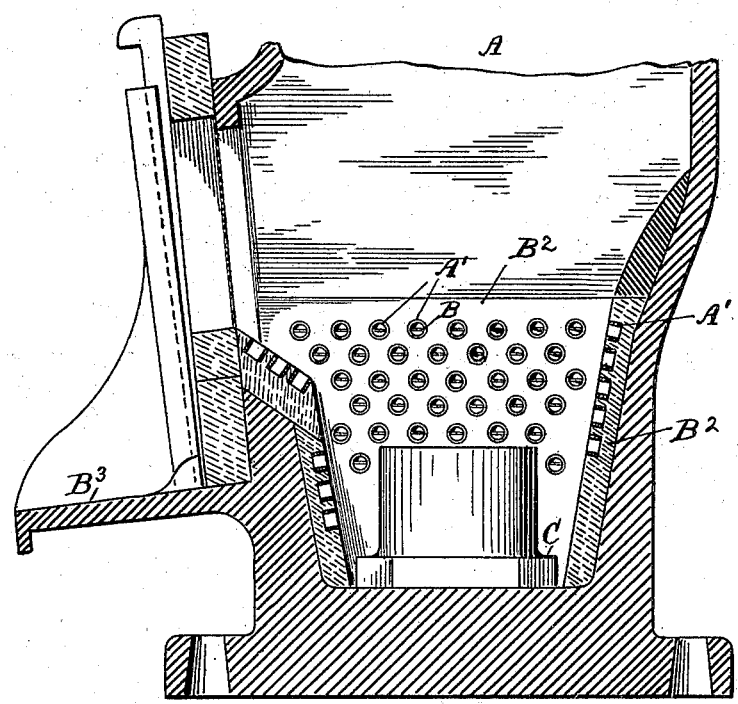
Figure 4:
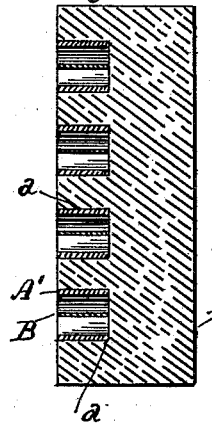
Figure 2:
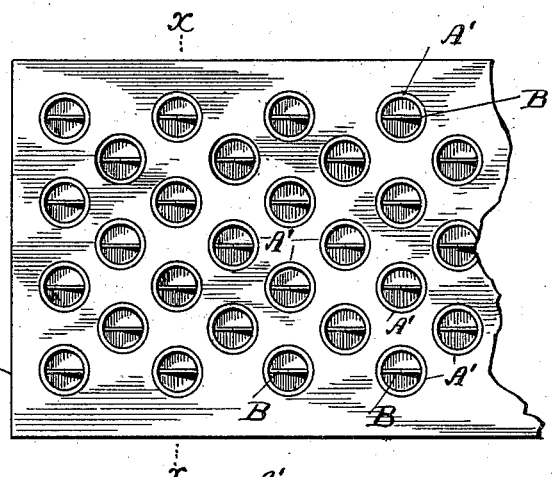
Figure 3:
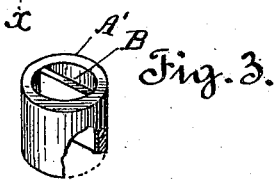

Figure 1 is a broken view of an ordinary battery with the improved trap arranged therein. Fig. 2 is a plan view of a plate provided with a series of traps or cells for the amalgam. Fig. 3 is a detail view of one of the cells which constitute the trap, and Fig. 4 is a cross-sectional view on line $x\,x$, Fig. 2.

In the drawings the letter A is used to indicate the battery or mortar of an ordinary stamp-mill, within which the ore is treated or worked and within which in the present case the trap is arranged.

The trap consists of a series of hollow metallic shells or cells A', preferably composed of tubing and circular in form. However, the shape of the cells is an immaterial feature of the invention. The interior of each cell is divided into two compartments by means of the partition or lining-piece B, which partition or lining-piece is composed of copper. Each cell is composed of two dissimilar pieces of metal so associated as to constitute a voltaic battery, which attracts and deposits the amalgam upon the inner surface thereof. If desired, the cell-tube may be composed of copper and the partition-piece of a dissimilar metal. Ordinarily the cells are arranged in series fitted within sockets $a$ of a board or plate $B^2$. When so arranged, the trap thus formed is secured to the chuck-block or cheek-plates of the battery. Still the location of the trap is immaterial, as it may be outside of the battery or one located outside and one within the battery. By thus arranging the trap the amalgam is caught within the battery; likewise such as escapes therefrom. The partition-piece B is made removable from its cell in order to facilitate the removal of amalgam therefrom. When a clean-up is made, the trap is removed and the amalgam recovered from the cells thereof in the manner usual to treatment of amalgamating-plates.

It will be understood that the cells may be fitted within sockets formed in the chuck-block or cheek-plates of the battery or in the apron $B^3$ thereof. The cells may be placed within the outer edge of the die-ring C of the battery, as shown in Fig. 1 of the drawings. During the working of the stamps the ore is pulverized and the quicksilver thoroughly intermixed therewith. The freed gold is collected by the quicksilver within the battery, which amalgam being splashed and distributed during the action of the stamps works over the trap-cells and is caught and retained thereby.

Having thus described the invention, what is claimed as new, and desired to be protected by Letters Patent, is—

1. An amalgam-trap comprising a plate having a recess therein, and a cell in said recess comprising a tubular body portion and a partition therein, said body portion and partition being composed of dissimilar metals, substantially as described.

2. An amalgam-trap comprising a plate having a recess therein, and a cell in said recess comprising a tubular body portion and a partition therein adapted to be inserted into or withdrawn from either end of the body portion, said body portion and the partition being composed of dissimilar metals, substantially as described.

3. An amalgam-trap comprising a plate having a recess therein, and a cell in said recess comprising a tubular body portion and a removable partition therein, said body portion and partition being composed of dissimilar metals, substantially as described.

In witness whereof I have hereunto set my hand.

GEORGE R. TUTTLE.

Witnesses:
N. A. ACKER,
D. B. RICHARDS.